United States Patent [19]

Mitsunaga et al.

[11] Patent Number: 5,413,078
[45] Date of Patent: May 9, 1995

[54] ENGINE CONTROL SYSTEM

[75] Inventors: Seisuke Mitsunaga, Hiroshima; Naoya Matsuo, Higashihiroshima; Akihito Nagao; Yasunori Sasaki, both of Hiroshima, all of Japan

[73] Assignee: Mazda Motor Corporation, Hiroshima, Japan

[21] Appl. No.: 15,169

[22] Filed: Feb. 8, 1993

[30] Foreign Application Priority Data

Feb. 6, 1992 [JP] Japan .................................. 4-021347

[51] Int. Cl.⁶ .............................................. F02D 43/00
[52] U.S. Cl. ..................................... 123/492; 123/493; 123/682; 123/685
[58] Field of Search ............... 123/492, 491, 493, 585, 123/589, 682, 685, 686, 698

[56] References Cited

U.S. PATENT DOCUMENTS 4,434,768 3/1984 Ninomiya ...................... 123/682 X
4,492,211 1/1985 Shinomura et al. ................. 123/682
4,569,318 2/1986 Fujimura et al. ................ 123/682 X

FOREIGN PATENT DOCUMENTS 211544 12/1983 Japan ................................... 123/685
59-208141 11/1984 Japan .
246461 10/1988 Japan ................................... 123/682

Primary Examiner—Tony M. Argenbright
Attorney, Agent, or Firm—Keck, Mahin & Cate

[57] ABSTRACT

A control system in an automobile has a controller to provide an air-to-fuel ratio leaner than an ideally combustible air-to-fuel ratio when a lean control range of engine operating conditions is detected, and a controller to increase an air flow rate so as to enrich a fuel mixture when an engine operating condition is transitional to the lean control range. The control system conducts sequentially the lean control and the enrich control according to transitional patterns to the lean control range.

7 Claims, 6 Drawing Sheets

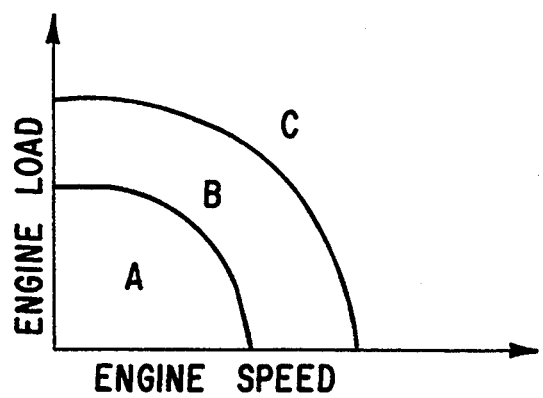
FIG. 3
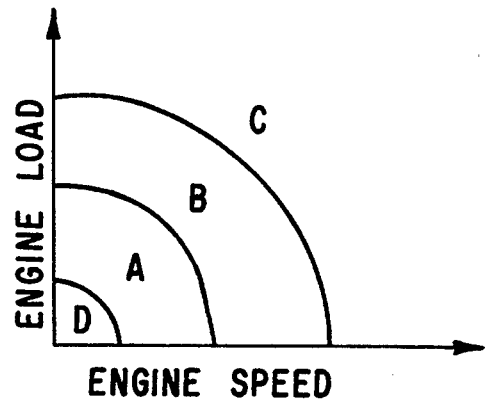
FIG. 5
| PATTERN | P VALVE | S VALVE |
|---------|---------|---------|
| A | ◔ | ◯ |
| B | ◯ | ◯ |
| C | ◯ | ◯ |
FIG. 4

ENGINE CONTROL SYSTEM

BACKGROUND OF THE INVENTION

1. Field of the Invention

This invention relates to a control system for an internal combustion engine and, more particularly, to an engine control system for controlling an air-to-fuel ratio leaner than an ideal combustible air-to-fuel ratio.

2. Description of Related Art

In order for automobile engines to improve fuel economy, an air-to-fuel ratio is controlled to be leaner than an ideally combustible air-to-fuel ratio while the engine has been warmed up and operates with light engine load. Such an air-to-fuel control, known as a lean control, is known from, for instance, Japanese Unexamined Patent Publication No.59-208141.

In the case of conducting a lean control while the engine has been warmed up and operates with a light engine load, the air-fuel mixture setting is suddenly varied to be lean after having been maintained at an ideally combustible air-fuel mixture setting for a while. During the transition of air-fuel mixture setting to a leaner air-to-fuel ratio, a reduction in the amount of fuel delivered by an injector occurs. Such a fuel reduction leads to a temporary engine torque drop and, hence, adversely affects the driving performance of the automotive vehicle. In this instance, it has been proposed to supplementally cancel the torque drop caused due to a fuel reduction through what is referred to as an "enrich control" in which intake air is introduced by the aid of an idle speed control valve (ISC valve), for allowing and regulating intake air to bypass a throttle valve, so as to enrich a fuel mixture when the lean control is conducted. However, only conducting the lean control accompanied by the enrich control during the transition of air-fuel mixture setting to a leaner air-to-fuel ratio causes a temporary drop in output torque of the engine due to the difference between responsiveness of fuel flow and air flow. For example, when the lean control commences during acceleration, fuel flow increases its flow rate with a relatively high responsiveness and air flow is sluggish in responsiveness. On the other hand, when the lean control commences during deceleration, since air is introduced into the engine due to an inertial flow of intake air and/or a Stagnation downstream from the throttle valve at the beginning of deceleration in addition to an increase in amount of air provided by the enrich control, a feeling of deceleration becomes poor. The lean control is ordinarily conducted not during a cold period in which the stability of fuel combustibility is possibly lowered but after warming-up. However, if an abrupt increase in the amount of intake air is caused by the enrich control, at the commencement of the lean control when the lean control is conducted, as a result of a transition to a warm-up condition from a cold condition while the engine operates in a range of lower engine loads, the engine output torque will suddenly jump up, so that a so called "torque shock" is experienced. This is because the air charge rate increases before the air-to-fuel ratio of a fuel mixture becomes lean.

SUMMARY OF THE INVENTION

It is therefore an object of the present invention to provide a control system for controlling an air-to-fuel ratio in which a torque drop is accurately made up by means of an increase in amount of intake air during a lean control in accordance with transitional patterns of an engine operating condition to a specified range of engine operating conditions, in which the lean control is conducted, resulting from acceleration, deceleration and warm-up.

The foregoing object of the present invention is accomplished by providing a control system having an air-to-fuel ratio control means for controlling an air-to-fuel ratio of a fuel mixture delivered into an engine in accordance with engine operating conditions. The control system includes a lean control means to control the air-to-fuel ratio control means to provide an air-to-fuel ratio leaner than an ideally combustible air-to-fuel ratio when a lean control range of engine operating conditions is detected, and an enrich control means to increase an air flow rate at which air is introduced into the engine during an engine operating condition transitional to the lean control range of engine operating condition. A control managing means is provided so as to conduct sequentially controls by the lean control means and the enrich control means according to transitional patterns of engine operating condition to the specified range of engine operating condition. The transitional patterns include an acceleration pattern in which a transition of engine operating condition to the lean control range of engine operating condition is conducted as a result of acceleration of the engine, a deceleration pattern in which a transition of engine operating condition to the lean control range of engine operating condition is conducted as a result of deceleration of the engine, and a warm-up pattern in which a transition of engine operating condition to the lean control range of engine operating condition is conducted as a result of warming up of the engine. The enrich control means comprises an idle speed control valve disposed in an intake air line to the engine for regulating an air flow rate so as to control an engine speed during engine idling.

Specifically, a control by the enrich control means is conducted prior to a control by the lean control means when the acceleration pattern is detected. On the other hand, when the deceleration pattern is detected, the control by the lean control means is conducted prior to the control by the enrich control means. Further, the control by the lean control means is also conducted prior to the control by the enrich control means when the warm-up pattern is detected.

The control system in accordance with the present invention differently establishes the sequential order of execution of the lean and enrich controls, in accordance with the transitional patterns to the lean control range of engine operating condition, so as to accurately control an air-to-fuel ratio of a fuel mixture. That is, in the acceleration pattern, the enrich control is conducted in expectation of a delay of response of air flow increase so as to positively prevent a torque drop of the engine, thereby assuring a good feeling of acceleration. On the other hand, in the deceleration pattern, the enrich control is conducted at a timing for not promoting a delay of deceleration due to an inertial flow of intake air and/or a stagnation downstream from the throttle valve at the beginning of deceleration, thereby preventing a deteriorated feeling of deceleration. Furthermore, in the warm-up pattern, the enrich control is conducted when a fuel mixture has been actually turned lean by the lean control and, accordingly, there is no abrupt torque increase even if there is an intake air increase, thereby preventing torqueshock due to an intake air increase.

BRIEF DESCRIPTION OF THE DRAWINGS

The above and other objects and features of the present invention will be clearly understood from the following detailed description with respect to preferred embodiments thereof when considered in conjunction with the accompanying drawings, in which:

FIG. 3 is a diagram showing air intake pattern control ranges with respect to engine speed and engine load;

FIG. 4 is a diagram showing air intake patterns of a primary and secondary throttle valves;

FIG. 5 is a diagram showing air-to-fuel control ranges with respect to engine speed and engine load;

DETAILED DESCRIPTION OF THE PREFERRED EMBODIMENT

The term "lean control" as used herein shall mean and refer to the control by which a fuel mixture is controlled so that its air-to-fuel ratio is leaner that an ideally combustible air-to-fuel ratio, and the term "enrich control" as used herein shall mean and refer to the control by which a fuel mixture is controlled to be rich by introducing an increased amount of air.

Figure 1:
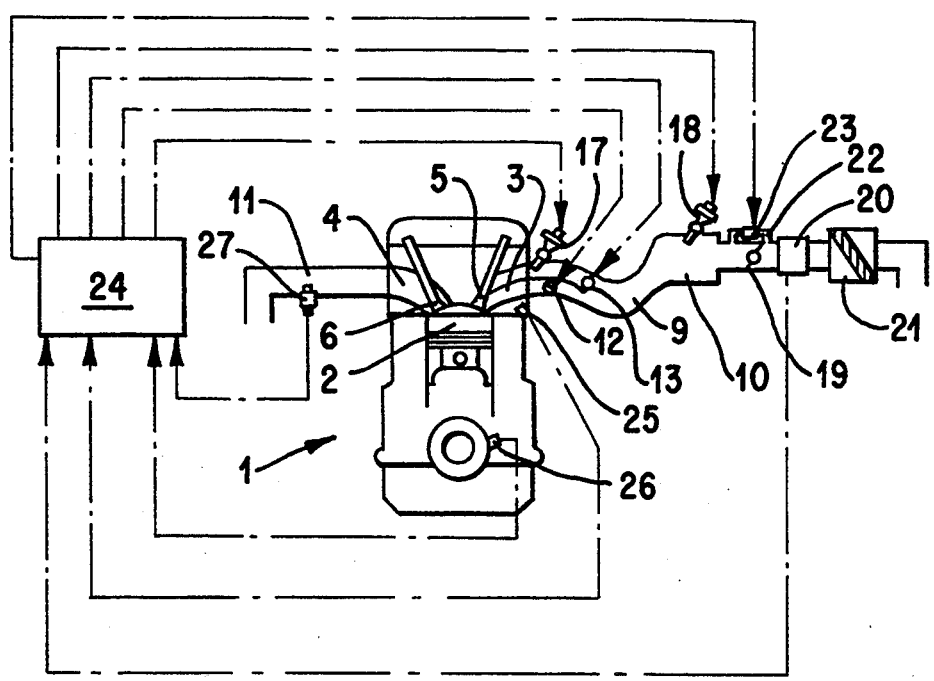
FIG. 1 is a schematic illustration showing an engine with a control system in accordance with a preferred embodiment of the present invention.
Figure 2:
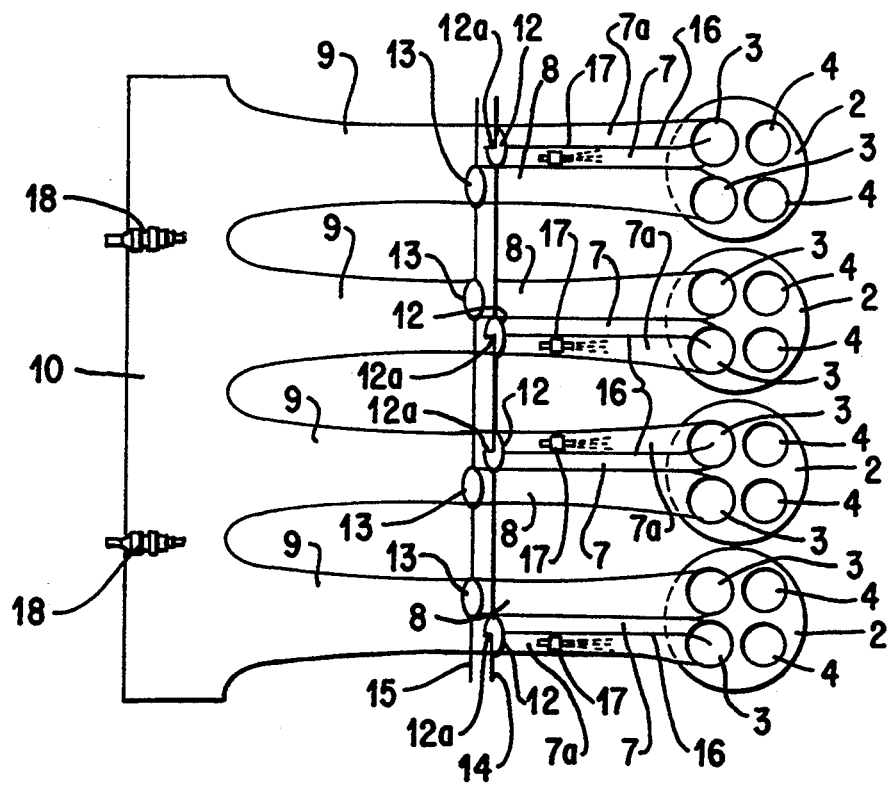
FIG. 2 is a schematic illustration showing an intake system of the engine shown in FIG. 1.

Referring to the drawings in detail, and in particular, to FIGS. 1 and 2, an in-line four cylinder type of engine 1, whose air-to-fuel ratio is controlled by means of a control system in accordance with a preferred embodiment of the present invention, is shown. These cylinders 2 of the engine 1 are, respectively, provided with two intake ports 3 whose openings separately extend toward a side of the engine block. Further, these cylinders 2 of the engine 1 are, respectively, provided with two exhaust ports 4 whose openings separately extend toward another side of the engine block of the engine 1. The intake ports 3 and the exhaust ports 4 open into the combustion chamber, and are opened and shut at a predetermined timing by intake valves 5 and exhaust valves 6, respectively.

Intake air is introduced into the cylinders 2 through a common intake pipe 10 and individual intake pipes 9 branching off from the common intake pipe 10. Each individual intake pipe 9 is divided into two passages, namely a primary passage 7 and a secondary passage 8. Exhaust gas is discharged from the cylinders 2 through exhaust pipes 11, respectively, on the other hand, fuel is delivered by means of two secondary injectors 18 positioned between adjacent individual intake pipes 9 in the common intake pipe 10 and individual primary injectors 17 positioned in the primary intake passages 7, respectively.

The primary passages 7 are, respectively, provided at their upstream ends with primary throttle valves 12 which are operated by a common shaft 14 to open and close the primary passages 7. The secondary passages 8 are, respectively, provided at their upstream ends with secondary throttle valves 13 which are operated by a common shaft 15 to open and close the secondary passages 8. The primary passages 7 are further provided with partition walls 16 which define quarter-circular internal passages, each of which forms an intake air flow deflector relative to the intake port 4 so as to develop induction turbulence or swirl in the combustion chamber and are called "swirl developing passages." Corresponding in shape to the swirl developing passages 7a, the primary throttle valves 12 are formed with quarter-circular cutouts 12a.

In the common intake pipe 10 there is provided a throttle valve 19 and an air flow meter 20 positioned upstream from the throttle valve 19. Further, the common intake pipe 10 is provided at its upstream end with an air cleaner 21. An idle speed control valve 23, which is well known as an ISC valve in the art, is installed within a bypass pipe 22 for allowing intake air to bypass the throttle valve 19.

All the primary throttle valves 12, the secondary throttle valves 13, the primary and secondary injectors 17 and 18, and the ISC valve 23 are controlled in operation by means of a control unit 24 having an internal microcomputer based on the amount of intake air, the temperature of engine coolant, the rotational speed of engine, and the air-to-fuel ratio of fuel mixture. These control parameters are monitored by the aid of meter a and sensors. Specifically, the air flow meter 20 detects the rate of intake air flow at which air is introduced into the cylinders 2 and provides an electric signal representative of the detected air flow rate to the control unit 24. A temperature sensor 25, provided in association with a water jacket (not shown) of the engine 1, detects the temperature of engine coolant in the water jacket and provides an electric signal representative of the detected coolant temperature to the control unit 24. A crank angle sensor 26, provided in association with a crankshaft (shown only schematically) of the engine 1, detects the turned angle of the crankshaft as an engine speed of rotation and provides an electric signal representative of the rotational speed of engine to the control unit 24. Further, an oxygen ($O_2$) sensor 27, which is provided in the exhaust pipe 11 and is sensitive to the oxygen content of the exhaust, monitors the exhaust to vary the fuel mixture setting. All of these meter and sensors 20 and 25-27 are well known in the automobile art and may take any known form or be of any conventional type.

Referring to FIGS. 3 and 4, engine operating conditions are divided into three air intake pattern control ranges A, B and C for different air intake patterns of the primary throttle valve 12 and the secondary throttle valve 13 according to engine load and engine speed. That is, in the air intake pattern control range (strong swirl range) A established for lower engine loads and lower engine speeds, both primary and secondary throttle valves 12 and 13 are closed. As a result, since only the swirl developing passages 7a remain opened through the quarter-circular cutout 12a of the primary throttle valves 12, intake air flows into the combustion chamber at a high speed only through the swirl developing passages 7a and causes a strong swirl of intake air in it. In the air intake pattern control range (poor swirl range) B established for moderate engine loads and moderate engine speeds, while the secondary throttle valve 13 remains closed, the primary throttle valve 12 is opened, so that intake air is introduced into the combustion chamber through the entire primary passage 7. In this instance, only a poor swirl of intake air is generated in the combustion chamber. In the air intake pattern control range (non-swirl range) C established for high engine loads and high engine speeds, both primary and secondary throttle valves 12 and 13 are opened. Intake air is then introduced into the combustion chamber through both entire primary and secondary passages 7 and 8. Consequently, a compression turbulence or squish of intake air is generated in the combustion chamber.

Controlling the air-to-fuel ratio is made by regulating the amount of fuel delivered by the primary and secondary injectors 17 and 18 according to engine operating conditions concerning engine load and engine speed which are divided into four air-to-fuel ratio control ranges A, B, C and D for different air-to-fuel ratio ratios as shown in FIG. 5. The air-to-fuel ratio control ranges A, B and C correspond exactly to the air intake pattern control-ranges A, B and C, respectively. In the air-to-fuel ratio control range (lean feedback control range) A, corresponding to the strong swirl range A, established for lower engine loads and lower engine speeds, a lean feedback control, in which the target air-to-fuel ratio (which is referred to as a target lean air-to-fuel ratio or (TLAFR) is set lower than an ideally combustible air-to-fuel ratio, is conducted. In the control range ($\lambda=1$ feedback control range) B, corresponding to the poor swirl range B, established for moderate engine loads and moderate engine speeds, what is called a "$\lambda=1$ feedback control" is conducted. In the air-to-fuel ratio control range (enriching feedback control range) C, corresponding to the non-swirl range C, established for high engine loads and high engine speeds, an enrich air-to-fuel ratio open control, in which the target air-to-fuel ratio (TAFR) is set higher than an ideally combustible air-to-fuel ratio, is conducted. In addition, in the air-to-fuel ratio control range ($\lambda=1$ feedback control range) D, which is established for idling, the $\lambda=1$ feedback control is conducted. In each of the lean feedback control in the lean feedback control range A and the $\lambda=1$ feedback control in the air-to-fuel ratio control ranges B and D, the air-to-fuel ratio control system, which is sensitive to the oxygen content of the exhaust detected by the oxygen sensor 32, determines the proper air-to-fuel ratio and then constantly monitors its exhaust to verify the accuracy of the mixture setting. Specifically, the system calculates a feedback correction value of fuel injection and adds it to a principal fuel injection determined based on engine speed and engine load. Then, the total fuel injection is further corrected in accordance with the temperature of engine coolant to provide an effective fuel injection. The lean feedback control in the air-to-fuel ratio control range A is conducted at engine coolant temperatures above 80 degrees Centigrade. On the other hand, the $\lambda=1$ feedback control in the air-to-fuel ratio control ranges B and D is conducted at engine coolant temperatures above 60 degrees Centigrade.

In addition to the primary function of maintaining the idle speed of the engine at a target idle speed of, for instance, approximately 700 rpm. during idling, the ISC valve 23 functions to provide an increase in amount of intake air so as to compensate for a drop in engine output torque caused at the beginning of the lean feedback control in the air-to-fuel ratio control range A. In order for the lean feedback control to take place, the engine 1 must operate in the lean feedback control range A, the engine must be warmed up, and the temperature of engine coolant is higher than 80 degrees Centigrade. In accordance with transitional patterns, one of the lean feedback control and the intake air increasing control by the ISC valve 23 is preferentially conducted. Specifically, when the engine 1 changes its operating condition into the lean feedback control range A from the $\lambda=1$ feedback control range D as a result of acceleration and satisfies all of the conditions of the lean feedback control, the intake air increasing control is conducted prior to the other control. Then, the lean feedback control is commenced a predetermined period of time thereafter. On the other hand, when the engine 1 changes its operating condition into the lean feedback control range A from the $\lambda=1$ feedback control range B as a result of deceleration and satisfies the conditions and when the engine 1 is warmed up while it operates stably in the lean feedback control range A, the lean feedback control is immediately commenced prior to the other control. Then, the intake air increasing control is conducted a predetermined period of time thereafter.

The operation of the engine depicted in FIGS. 1 and 2 is best understood by reviewing FIGS. 6-9, which are flow charts illustrating various routines for the microcomputer of the control unit 24. Programming a computer is a skill well understood in the art. The following description is written to enable a programmer having ordinary skill in the art to prepare an appropriate program for the microcomputer of the control unit 24. The particular details of any such program would of course depend upon the architecture of the particular computer selected.

Figure 6:
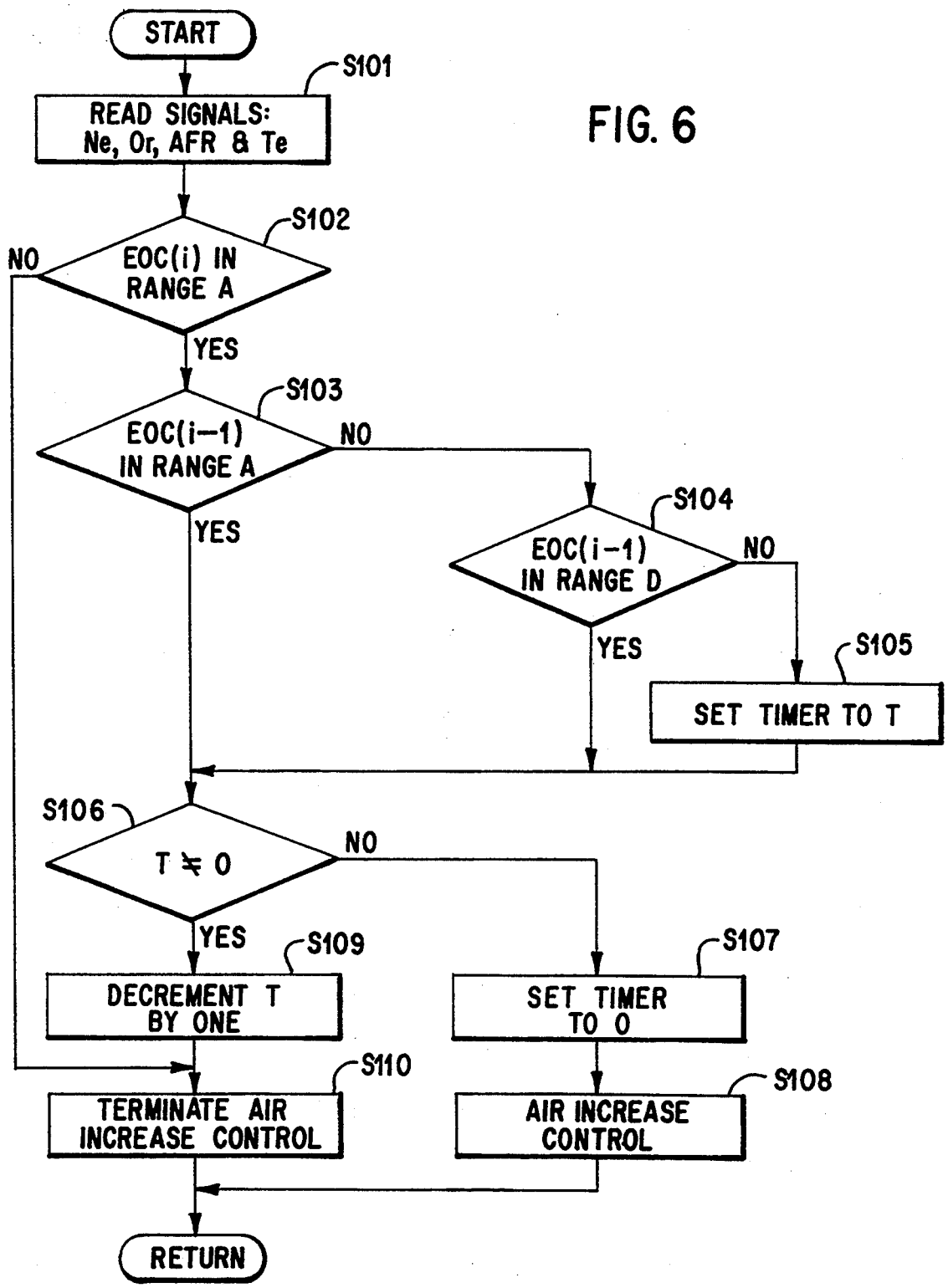
FIG. 6 is a flow chart illustrating an enrich control sequential routine for increasing an air flow rate during a transition of engine operating condition to a lean control range.
Figure 7:
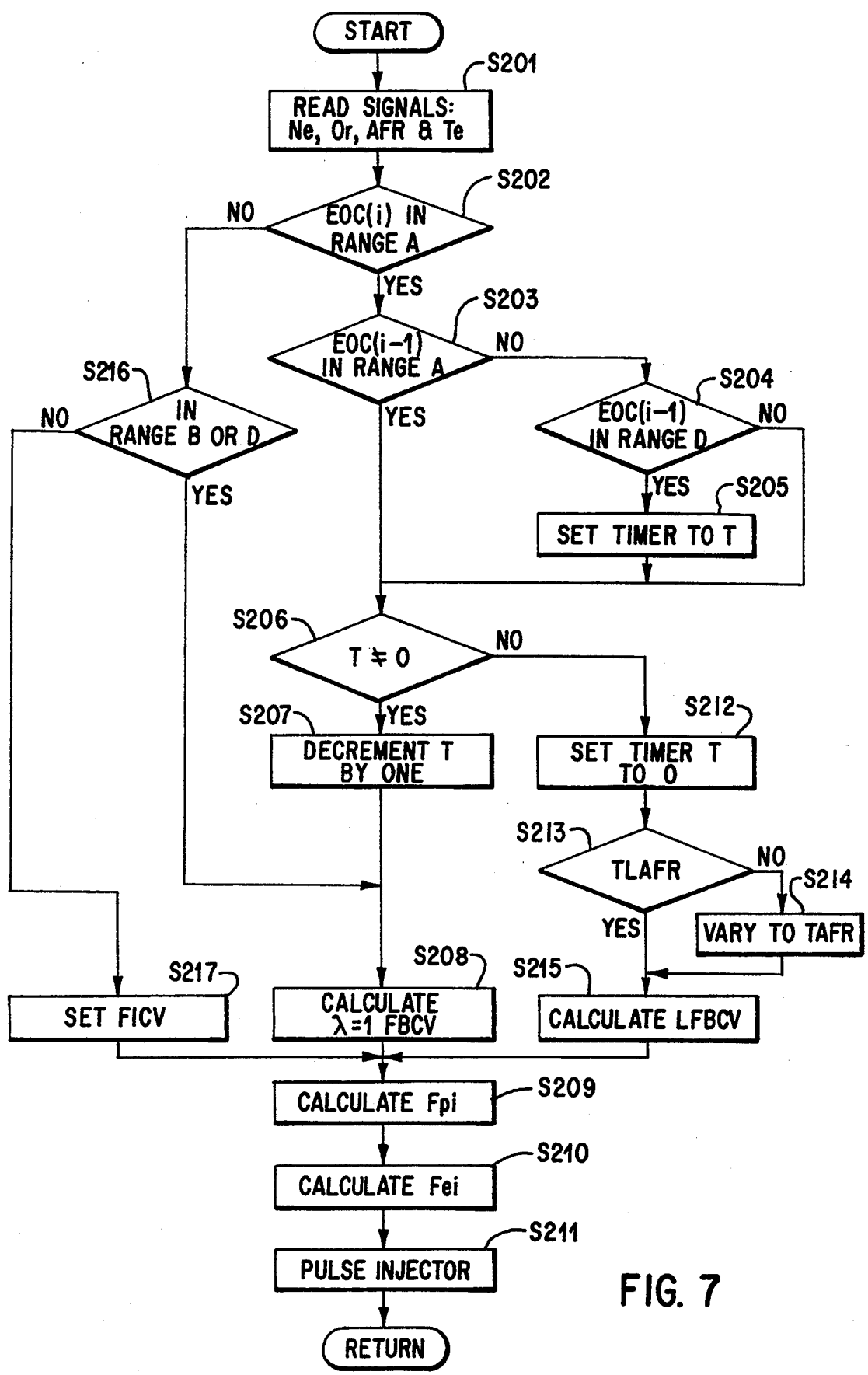
FIG. 7 is a flow chart illustrating a lean control sequential routine for controlling an air-to-fuel ratio of a fuel mixture to be lean during a transition of engine operating condition to a lean control range.

Referring to FIGS. 6 and 7, which are flow charts of the sequential routines of the intake air increasing control and the lean feedback control, respectively, for the microcomputer when the engine 1 changes its operating condition into the lean feedback control range A as the result of acceleration or deceleration after it has been warmed up.

In a flow chart of the intake air increasing control routine shown in FIG. 6, after reading various control factors, such as an engine speed (Ne), an intake air flow rate (Qr), etc., at step S101, a decision is made at step S102 whether or not the current engine operating condition EOC(i) is in the lean feedback control range A. If the answer to the decision is "YES," then, another decision is made at step S103 whether or not the last engine operating condition EOC(i-1) is in the lean feedback control range A. If the answer is "NO," this indicates that the engine 1 operated out of the lean feedback control range A in the last cycle, then, a decision is made at step S104 whether or not the last engine operating condition EOC(i-1) is in the $\lambda=1$ feedback control range D. This decision is made in order to determine whether the engine 1 has changed its operating condition into the lean feedback control range A as the result of acceleration or deceleration. If the answer to the decision is "YES," this indicates that the engine 1 changed its operating condition into the lean feedback control range A from the $\lambda=1$ feedback control range D as the result of acceleration, and after setting an internal timer to a specified count T at step S105 the answer to the decision is "NO," this indicates that the engine 1 has changed its operating condition into the $\lambda=1$ feedback control range B from the enriching feedback control range B as the result of deceleration. A decision is made at step S106 whether the specified time T is counted down to zero (0). Because when the engine is under acceleration, the answer to the decision made at step S106 is "NO," then after resetting the timer to zero (0) at step S107, the intake air increasing (IAI) control is immediately performed at step S108. In this instance, in the following cycles, if the answer to the decision made at step S103 becomes "YES," the intake air increasing (IAI) control is continued at step S108. However, in the event of the transition of engine operating condition into the lean feedback control range A as the result of deceleration, since the timer has been set to the specified count T in the last cycle, the answer to the decision made at step S106 is "YES," then after changing the timer count by one decrement at step S109, an increase in quantity of intake air is set to zero(0) at step S110.

If the answer to the decision concerning the feedback control ranges made at step S102 is "NO," this indicates that the current engine operating condition EOC(i) is out of the lean feedback control range A. Then, the quantity increase Q of intake air is set to zero(0) at step S110.

Referring to FIG. 7, which is a flow chart of the lean feedback control subroutine during the transition to the lean feedback control range A, after reading various control factors, such as an engine speed (Ne), an intake air flow rate (Qr), an air-to-fuel ratio (AFR) and an engine coolant temperature (Te) at step S201, a decision is made at step S202 whether or not the current engine operating condition EOC(i) is in the lean feedback control range A. If the answer to the decision is "YES," then another decision is made at step S203 whether or not the last engine operating condition EOC(i-1) is in the lean feedback control range A. If the answer is "NO", then, a decision is made at step S204 whether or not the last engine operating condition EOC(i-1) changed into the lean feedback control range A from the $\lambda=1$ control range D as a result of acceleration or deceleration. If the answer to the decision is "YES," and after setting an internal timer to a specified count T at step S205 if the answer to the decision is "NO," a decision is made at step S206 whether the specified time T is counted down to zero (0). If the transition of engine operating condition is made into the lean feedback control range A as the result of deceleration, the answer to the decision made at step S106 is "NO," then, the timer is reset to zero (0) at step S212. However, in the event of the transition of engine operating condition into the lean feedback control range A as the result of deceleration, since the timer has been set to the specified count T at step S205 in the last cycle, the answer to the decision made at step S206 is initially "YES," then the timer count T of the timer is changed by one decrement at step S207. In order to continuously execute the $\lambda=1$ feedback control in which an air-to-fuel ratio is controlled with the ideally combustible air-to-fuel ratio as a target air-to-fuel ratio (TAFR) until the timer count T is counted down to zero (0), a $\lambda=1$ feedback correction value ($\lambda=1$ (FBCV) of fuel injection is calculated at step S208. Thereafter, at step S209, a principal fuel injection (Fpi) is calculated on the basis an engine speed and an engine load. The principal fuel injection is added with the $\lambda=1$ feedback correction value ($\lambda=1$ FBCV) and then corrected in accordance with the an engine coolant temperature (Te), etc., to provide an effective fuel injection (Fei) for the $\lambda=1$ feedback control at step S210. According to the effective fuel injection (Fei), the injectors 17 are pulsed at step S211. In the following cycle, if the answer to the decision concerning the lean feedback control range A made at step S203 turns "YES," the steps S207–S211 are taken to continue the $\lambda=1$ feedback control until the timer count T is counted down to zero (0).

When the answer to the decision concerning time made at step S206 turns "NO," after setting the timer to zero (0) at step S212, a decision is made at step S213 whether or not the target air-to-fuel ratio (TAFR) is a target lean air-to-fuel ratio (TLAFF) which the lean feedback control finally provides If the answer is "NO," the target air-to-fuel ratio (TAFR) is gradually varied until it becomes equal to the target lean air-to-fuel ratio (TLAFF) at step S214. At step S215, a lean feedback correction value of fuel injection (LFBCV) is calculated on the basis of the deviation between a current air-to-fuel ratio (AFR(i)) and the target lean air-to-fuel ratio (TLAFF). Through the steps S209 and 210, from a principal fuel injection and the lean feedback correction value of fuel injection (LFBCV), an effective fuel injection (Fei) is provided for the lean feedback control.

In the event the engine 1 changes its operating condition into the lean feedback control range A as a result of deceleration, the timer has not been set, so that the answer to the decision made at step S206 is "NO," the injection control procedure takes place through the steps S212–S215 to execute immediately the lean feedback control.

In any following cycle, if the answer to the decision made at step S203 is "YES," then, directly thereafter the decision concerning the time is made at step S206. However, in this event, since the timer count is zero (0), the injection control procedure through the steps S212–S215 is repeated to continue the lean feedback control.

On the other hand, if the answer to the decision made at step S202 is "NO," this indicate the current engine operating condition is in any one of the air-to-fuel ratio control ranges B, C and D. Then, a decision is made at step S216 whether or not the engine operating condition is in the air-to-fuel ratio control range B or D. If "YES," the $\lambda=1$ feedback control is conducted through steps S208–211 However, if "NO," then after an increase correction value of fuel injection (FICV) is established so as to enrich a fuel mixture at step S217, the injection control procedure takes place through the steps S209–S211. In the air-to-fuel ratio control ranges A, B and D, only the primary injectors 17 are pulsed, and in the air-to-fuel ratio control range C, both the primary and secondary injectors 17 and 18 are pulsed.

Figure 8:
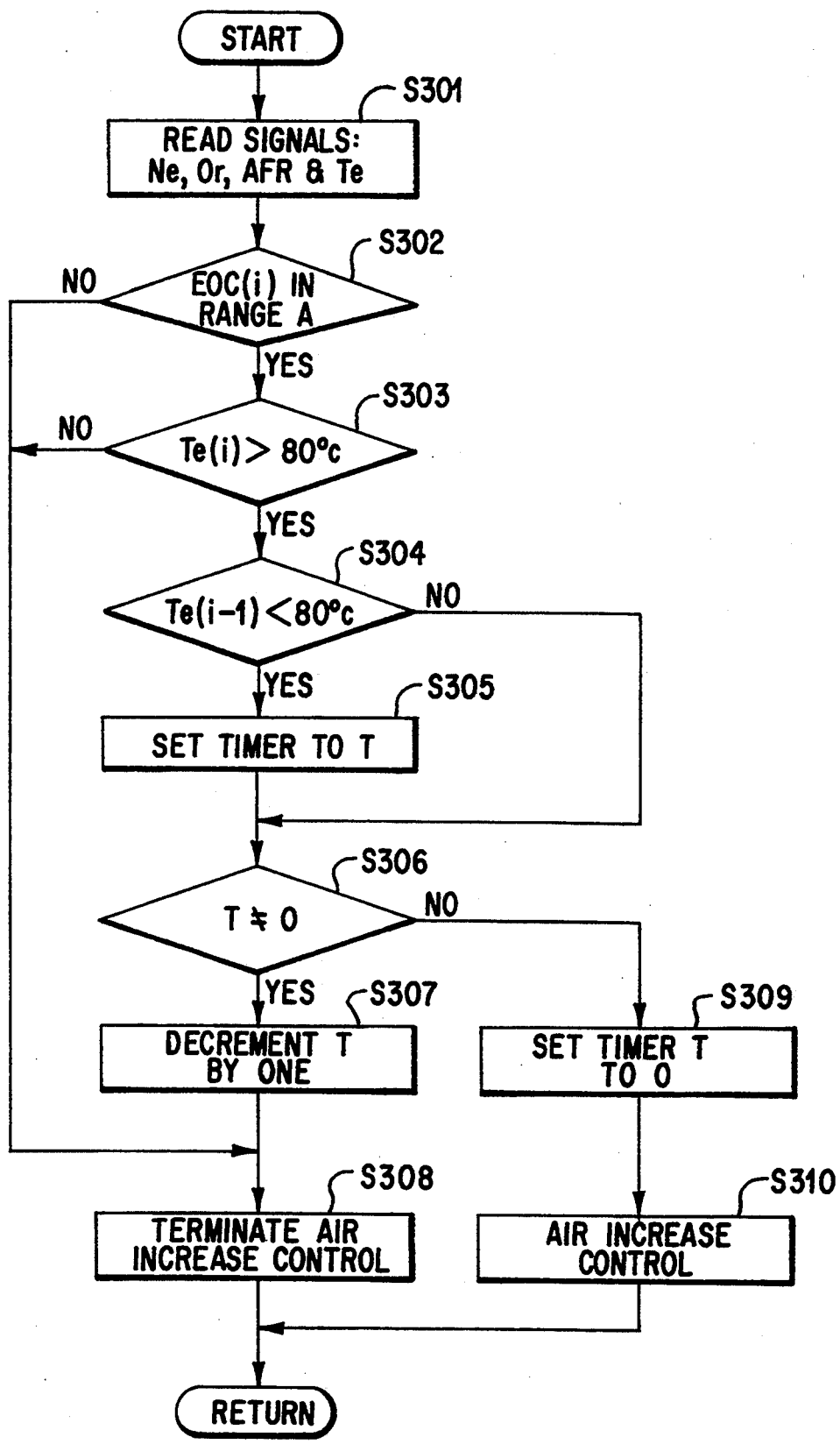
FIG. 8 is a flow chart illustrating an enrich control sequential routine for increasing an air flow rate after warming up of the engine.
Figure 9:
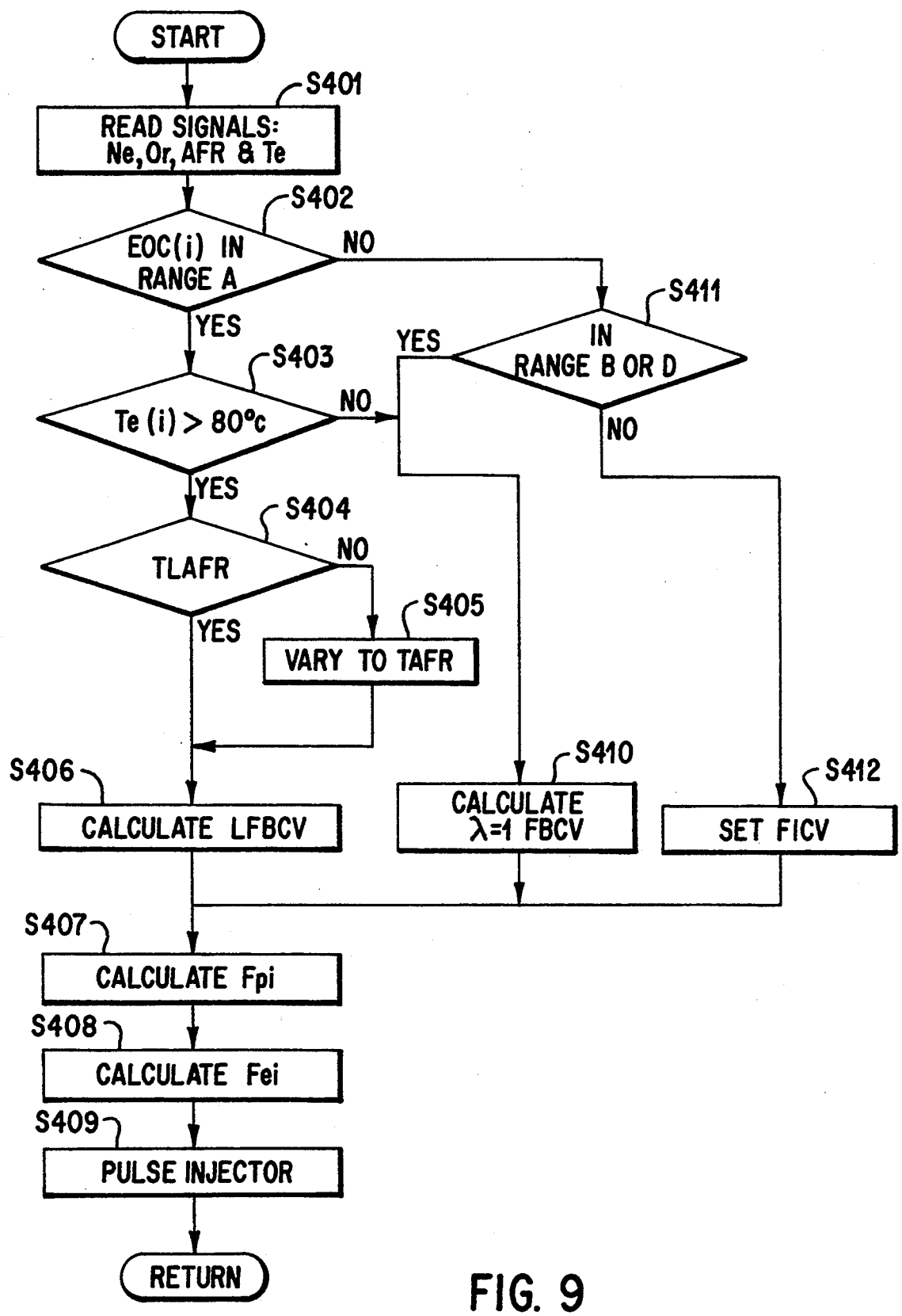
FIG. 9 is a flow chart illustrating a lean control sequential routine for controlling an air-to-fuel ratio of a fuel mixture to be lean after warming up of the engine.

FIGS. 8 and 9 are flow charts of the sequential routines of the intake air increasing control and the lean feedback control, respectively, for the microcomputer when the engine 1 changes its operating condition into the lean feedback control range A as the result of warming up of the engine.

As shown in FIG. 8, after reading various control factors, such as an engine speed (Ne), an intake air flow rate (Qr), an air-to-fuel ratio (AFR) and an engine coolant temperature (Te), at step S301, a decision is made at step S302 whether or not the current engine operating condition EOC(i) is in the lean feedback control range A. If the answer to the decision is "YES," then, a decision is made at step S303 whether or not the current engine coolant temperature (Te(i)) is higher than a specified temperature of, for example, approximately 80 degrees Centigrade. If the answer to the decision is "YES," this indicates that the engine 1 has warmed up, then, another decision is made at step S304 whether or not the last engine coolant temperature (Te(i−1)) is lower than the specified temperature of approximately 80 degrees Centigrade. After setting an internal timer to a specified count T at step S305 if the answer to the decision is "YES," or if the answer to the decision is "NO," a decision is made at step S306 whether the specified time T has been counted down to zero (0). Because when the engine is warmed up for the first time in the current cycle, the timer has been set to a specified time T, the answer to the decision made at step S306 is definitely "YES." If in fact the answer to the decision is "YES,∞ then after changing the timer count by one decrement at step S307, an increase in quantity of intake air is set to zero(0) so as to quit the intake air increasing control at step S308. However, if the answer to the decision made at step S306 turns "NO," then after resetting the timer to zero (0) at step S309, the intake air increasing control is conducted at step S310.

On the other hand, if the answer to the decision concerning the lean feedback control range A made at step S302 is "NO," and if the decision concerning the engine coolant temperature (Te) made at step S303 is "NO," then, the intake air increasing control is immediately stopped at step S308.

Referring to FIG. 9, which is a flow chart of the lean feedback control subroutine during the transition to the lean feedback control range A as a result of warming up, after reading various control factors, such as an engine speed (Ne), an intake air flow rate (Qr), an air-to-fuel ratio (AFR) and an engine coolant temperature (Te) at step S401, a decision is made at step S402 whether or not the current engine operating condition EOC(i) is in the lean feedback control range A. If the answer to the decision is "YES," then another decision is made at step S403 whether or not the last engine operating condition EOC(i-1) is in the lean feedback control range A. If the answer to the decision is "YES," a decision is made at step S404 whether or not the target air-to-fuel ratio (TAFR) has become equal to a target lean air-to-fuel ratio (TLAFR) which the lean feedback control finally provides. After gradually varying the target air-to-fuel ratio (TAFR) to the target lean air-to-fuel ratio (TLAFR) at step S405 if the answer to the decision is "NO," or directly if the answer to the decision is "YES," a lean feedback correction value of fuel injection (LFBCV) is calculated on the basis of the deviation between a current air-to-fuel ratio (AFR(i)) and the target lean air-to-fuel ratio (TLAFF) at step S406. Thereafter, at step S407, a principal fuel injection (Fpi) is calculated on the basis an engine speed and an engine load. The principal fuel injection is added with the lean feedback correction value of fuel injection (LFBCV) and then corrected in accordance with the an engine coolant temperature (Te), etc., to provide an effective fuel injection (Fei) for the lean feedback control at step S408. In accordance with the effective fuel injection (Fei), the injectors 17 and 18 are pulsed at step S409.

If the answer to the decision concerning engine coolant temperature made at step S403 is "NO," this indicates that the engine is not sufficiently up. Then, in order to conduct the $\lambda=1$ feedback control, a $\lambda=1$ feedback correction value ($\lambda=1$ FBCV) of fuel injection is calculated at step S410. Thereafter, an effective fuel injection (Fei) is provided for the lean feedback control from a principal fuel injection and the lean feedback correction value of fuel injection (LFBCV) through steps S407 and 408.

On the other hand, if the answer to the decision concerning the lean feedback control range A made at step S402 is "NO," this indicates the current engine operating condition is in any one of the air-to-fuel ratio control ranges B, C and D. Then, a decision is made at step S411 whether or not the engine operating condition is in the air-to-fuel ratio control range B or D. If "YES," the $\lambda=1$ feedback control is conducted through steps S410-S409 as described above. However, if "NO," then, after an increase correction value of fuel injection (FICV) is established at step S412 so as to enrich a fuel mixture through steps S407-S409.

It is also to be understood that although the present invention has been described in detail with respect to a preferred embodiment thereof, various other embodiments and variants may occur to those skilled in the art. Such other embodiments and variants halls falling within the scope and spirit of the invention are intended to be covered by the following claims.

What is claimed is:

1. A control system having an air-to-fuel ratio control means for controlling an air-to-fuel ratio of a fuel mixture delivered into an internal combustion engine in accordance with engine operating conditions, said control system comprising:

monitoring means for monitoring engine operating conditions which are divided into a plurality of preselected ranges and for detecting a specified preselected range of engine operating conditions;

lean control means for controlling said air-to-fuel ratio control means to provide an air-to-fuel ratio which is leaner than an ideally combustible air-to-fuel ratio in response to detection of said specified preselected range of engine operating conditions by said monitoring means;

enriching control means for increasing an air flow rate at which air is introduced into said engine in response to detection of an engine operating condition transitional to said specified preselected range of engine operating conditions by said monitoring means;

transitional pattern detecting means for detecting transitional patterns of engine operating conditions to said specified preselected range of engine operating conditions, said transitional patterns including an acceleration pattern, in which a transition of an engine operating condition to said specified preselected range of engine operating conditions is occurring as a result of acceleration of the engine, and a deceleration pattern, in which a transition of an engine operating condition to said specified preselected range of engine operating conditions is occurring as a result of deceleration of the engine; and control managing means for conducting controls by said lean control means and said enriching control means sequentially.

2. A control system as defined in claim 1, wherein said enriching control means comprises an idle speed control valve disposed in an intake air line to the engine for regulating said air flow rate so as to control an engine speed during engine idling.

3. A control system as defined in claim 1, wherein said control managing means conducts a control by said enriching control means prior to a control by said lean control means when said transitional pattern detecting means detects said acceleration pattern.

4. A control system as defined in claim 1, wherein said control managing means conducts a control by said lean control means prior to a control by said enriching control means when said transitional pattern detecting means detects said deceleration pattern.

5. A control system as defined in claim 1, wherein said transitional patterns further include a warming-up pattern in which a transition of engine operating condition to said specified preselected range of engine operating conditions is occurring as a result of warming up of the engine.

6. A control system as defined in claim 5, wherein said control managing means conducts a control by said lean control means prior to a control by said enriching control means when said transitional pattern detecting means detects said warming-up pattern.

7. A control system having an air-to-fuel ratio control means for controlling an air-to-fuel ratio of a fuel mixture delivered into an internal combustion engine in accordance with engine operating conditions, said control system comprising:

monitoring means for monitoring engine operating conditions which are divided into a plurality of preselected ranges and for detecting a specified preselected range of engine operating conditions;

lean control means for controlling said air-to-fuel ratio control means to provide an air-to-fuel ratio which is leaner than an ideally combustible air-to-fuel ratio in response to detection of said specified preselected range of engine operating conditions by said monitoring means;

enriching control means for increasing an air flow rate at which air is introduced into said engine in response to detection of an engine operating condition transitional to said specified preselected range of engine operating conditions by said monitoring means;

transitional pattern detecting means for detecting transitional patterns of engine operating conditions to said specified preselected range of engine operating conditions, said transitional patterns including an acceleration pattern, in which a transition of an engine operating condition to said specified preselected range of engine operating conditions is occurring as a result of acceleration of the engine, and a deceleration pattern, in which a transition of an engine operating condition to said specified preselected range of engine operating conditions is occurring as a result of deceleration of the engine; and control managing means for conducting controls by said lean control means and said enriching control means.

* * * * *